United States Patent [19]

Myers et al.

[11] Patent Number: 5,007,236
[45] Date of Patent: Apr. 16, 1991

[54] REMOVABLE ROCKET MOTOR IGNITER

[75] Inventors: Robert I. Myers, New Hope; Bryce D. Brubaker; Robert E. Overall, both of Huntsville, all of Ala.

[73] Assignee: Morton Thiokol, Inc., Chicago, Ill.

[21] Appl. No.: 113,783

[22] Filed: Oct. 26, 1987

[51] Int. Cl.$^5$ .............................................. F02K 9/00
[52] U.S. Cl. .................................. 60/256; 60/39.823; 102/202
[58] Field of Search .................... 60/256, 39.823, 253, 60/39.821; 102/202, 380

[56] References Cited

U.S. PATENT DOCUMENTS

| | | | |
|---|---|---|---|
| 2,776,623 | 1/1957 | Bonner | 102/202 |
| 4,023,497 | 5/1977 | Morris et al. | 60/256 |
| 4,170,941 | 10/1979 | Reichard et al. | 102/202 |
| 4,573,316 | 3/1986 | Carrier et al. | 60/256 |
| 4,751,881 | 6/1988 | Fauconnier et al. | 60/256 |
| 4,787,203 | 11/1988 | Alfiero et al. | 60/39.823 |

Primary Examiner—Louis J. Casaregola
Assistant Examiner—Timothy S. Thorpe
Attorney, Agent, or Firm—James C. Simmons; Gerald K. White

[57] ABSTRACT

An igniter which is removably insertable in a rocket motor nozzle throat. The igniter includes a sleeve which has a body portion and a plurality of flexible and frangible tab members extending axially from one end of the body portion and spaced circumferentially thereabout and which have first portions which in combination define a diameter which is greater than the nozzle throat diameter. The frangible portions of the tab members in combination define an outer diameter which is substantially equal to the throat diameter. The body portion of the sleeve has a diameter which is greater than the throat diameter. The sleeve is insertable in the nozzle throat by flexing the tab members so that the first portions clear the throat and so that the frangible portions of the tab members are disposed in the throat. The tab members, in combination, have an inner diameter which is substantially equal to the inner diameter of the body portion of the sleeve. After the sleeve has been inserted in the throat, an igniter tube having a diameter substantially equal to the inner diameter of the sleeve is inserted into the sleeve and secured thereto thereby forcing the tab members into their original positions to lock the igniter into position during the ignition process. When the pressure in the rocket motor chamber reaches a predetermined pressure, the frangible portions of the tab members break so that the igniter is ejected from the nozzle.

17 Claims, 2 Drawing Sheets

REMOVABLE ROCKET MOTOR IGNITER

The present invention relates generally to igniters. More particularly, the present invention relates to igniters which are disposed in rocket motor nozzle throats for igniting the rocket motor propellant. Such igniters are desirably blown out of the nozzle after ignition has occured.

The methods previously proposed or used for attaching such igniters in a nozzle throat have not been as satisfactory as desired. An igniter which is locked in place by bonding a fragile styrofoam container to the nozzle throat so that the container may break and the igniter be blown out of the nozzle after ignition is not removable since breakage of the styrofoam container will usually occur if there is an attempt to remove it. The use of a threaded ring which is disposed on the propellant side of a nozzle throat and to which the igniter is threadably attached and which has tabs which fail in tension for ejecting thereof from the nozzle after ignition undesirably requires removal of the nozzle to install and to remove the igniter.

Thus, it is desirable to provide an igniter which is insertable in a rocket motor nozzle throat and which may be readily and easily removed without damage thereto and without having to remove the nozzle. It is also desirable to have the capability to readily and easily replace the igniter with a desicated shipping closure for handling safety during shipment and maintenance and the like or with a pressurization adapter.

Accordingly, it is an object of the present invention to provide a rocket motor nozzle throat igniter which is readily and easily removable without damage and without the necessity of removing the nozzle.

It is another object of the present invention to provide such an igniter which is readily and easily replaceable with a desicated shipping closure for safety during shipment and maintenance or with a pressurization adapter.

It is a further object of the present invention to provide such an igniter which, when installed, environmentally seals the rocket motor chamber.

It is still another object of the present invention to provide improved ignition performance.

It is another object of the present invention to provide such an igniter which is expelled from the nozzle at a predetermined pressure therein.

It is yet another object of the present invention to provide a removable igniter which is rugged, reliable, and inexpensive.

The above and other objects, features, and advantages of this invention will be apparent in the following detailed description of the preferred embodiments thereof which is to be read in connection with the accompanying drawings.

IN THE DRAWINGS

DETAILED DESCRIPTION OF THE PREFERRED EMBODIMENTS

Figure 1:
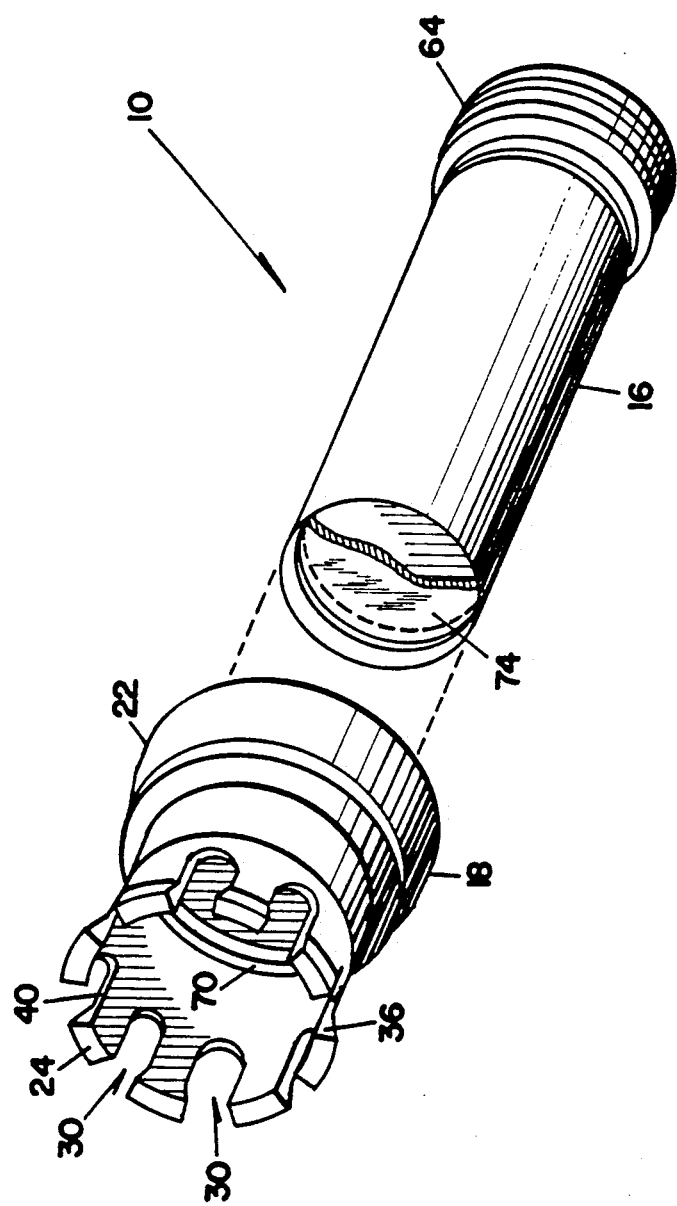
FIG. 1 is a perspective view of a disassembled igniter which embodies the present invention.
Figure 2:
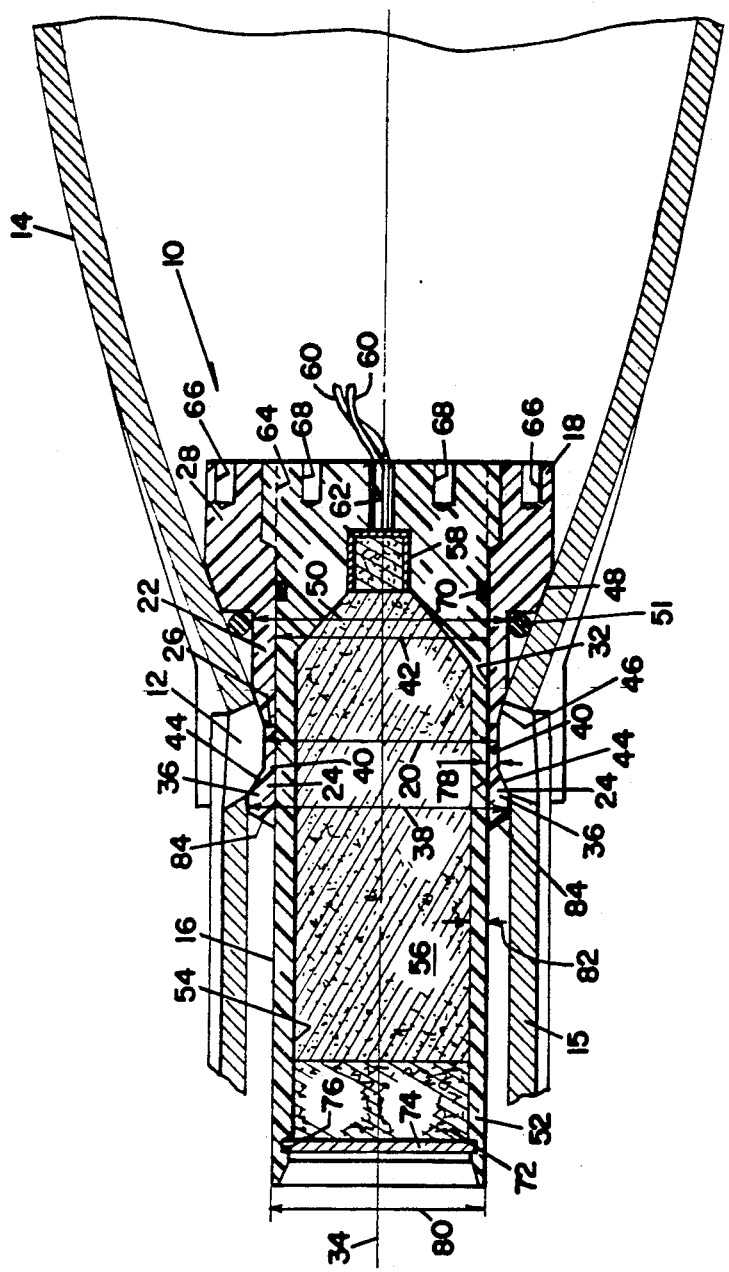
FIG. 2 is a side sectional view of the igniter of FIG. 1 installed in a rocket motor nozzle throat.

Referring to the drawings, there is shown generally at 10 an igniter. In FIG. 2, the igniter 10 is illustrated as installed in the throat 12 of nozzle 14 of a rocket motor. By nozzle throat is meant that portion of a nozzle which has the smallest inside diameter. The nozzle diverges therefrom for expansion of propulsion gases. The diameter of nozzle throat 12 is illustrated at 20 in FIG. 2. A blast tube portion 15 extends from the throat 12 in a direction inwardly of the rocket motor. However, the present invention does not require that a blast tube portion be provided, and the nozzle 14 may be of a conventional converging-diverging type. The igniter 10 includes an igniter tube 16 and a sleeve 18. In accordance with the present invention, a portion of igniter sleeve 18 is removably insertable beyond the nozzle throat 12 while another portion is prevented from passing through the nozzle throat as will be described hereinafter.

The sleeve 18 includes a body portion, illustrated at 22, and has an axis illustrated at 34 with respect to which the sleeve 18 is generally symmetrical. The sleeve 18 further includes a plurality of tab members 24 which extend axially, i.e., in a direction parallel to axis 34, from one end 26 of the body portion 22 so that they extend from the body portion end 26 inwardly of the rocket motor when the igniter is installed in the nozzle 14 thereof. The sleeve 18 has a generally cylindrical aperture or opening 32 extending coaxially therethrough for insertion of the igniter tube 16.

Figure 3:
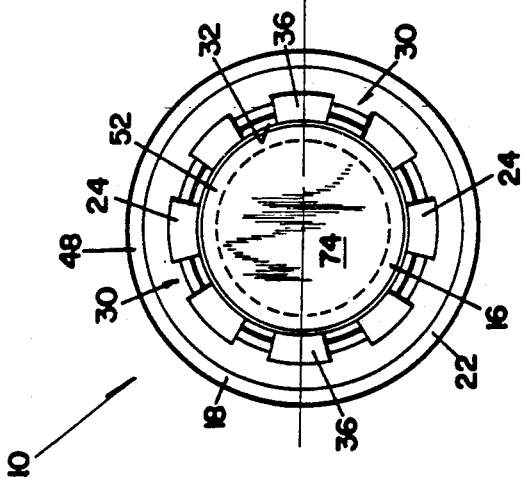
FIG. 3 is an end view, as viewed from inside a rocket motor when it is installed in the nozzle throat, of the igniter of FIGS. 1 and 2.

As illustrated in FIG. 3, a plurality of the tab members 24, which extend axially from the end 26 of the body portion 22, are spaced apart circumferentially of the body portion 22. Relative to the body portion 22, the axially outer portion 36 of each of the tab members 24 is configured to extend radially outwardly beyond the radially innermost portion of the nozzle throat 12 such that a diameter, illustrated at 38, defined by the plurality of first tab member portions 36 in combination is greater than the diameter 20 of the nozzle throat 12. As used in this specification and the claims, the terms "radial" and "radially" are meant to refer to directions perpendicular to the axis 34. By a reference herein and in the claims to a plurality of portions in combination having an outer or inner diameter is meant to refer to the diameter of a circle which is generated by passing a line through the respective radially outer or inner surfaces of the plurality of circumferentially spaced portions.

Thin flexible tab member portions 40 extend axially between and interconnect the thick first tab member portions 36 respectively and the body portion 22. These second tab member portions 40 are configured to have in combination an outer diameter which is substantially equal to the throat diameter 20 so that they may be disposed in the throat when the igniter 10 is installed in the nozzle 14, as illustrated in FIG. 2.

The axially inwardly (as viewed relative to the body portion 22) radially outer surface, illustrated at 44, of each of the thick first tab member portions 36 is contoured to conform to the shape of the nozzle 14 as the nozzle extends toward the inside of the rocket motor from the throat 12. In addition, the body portion 22 also has surfaces 46 and 48 which are contoured to conform to the shape of the nozzle 14 as it diverges outwardly from the throat 12. The body portion 22 has a diameter, illustrated at 50, which is greater than the diameter 20 of the throat 12 whereby the body portion 22 cannot pass through the throat 12. Radially outer surfaces 46 and 48 of the body portion 22 are preferably sized and contoured, in accordance with principles commonly known to those of ordinary skill in the art to which this invention pertains, to conform to the shape of the nozzle 14 in order to secure the body portion 22 in positions. An o-ring, illustrated at 51, or other suitable sealing means is preferably provided between the body portion 22 and the nozzle 14 to provide sealing therebetween.

The sleeve 18 including the tab members 24 is preferably composed of a single piece of material to be described hereinafter wherein the tab members 24 are integrally connected to the body portion 22 and the spaced apart tab members 24 may be flexed for effecting movement of the first tab member portions 36 radially inwardly so that they may be inserted through the throat 12. Inotherwords, the first tab member portions 36 are flexed inwardly so that in combination they define an outer diameter which is less than diameter 20 of the throat 12. While in this position, the plurality of first tab member portions 36 are inserted through the throat 12 and then released to assume the position shown in FIG. 2. However, the body portion 22 is sufficiently rigid that it does not pass through the nozzle throat 12. In order to provide such an integral sleeve as well as to maintain reduced manufacturing costs in accordance with a preferred embodiment of this invention, the sleeve 18 and the igniter housing 52 are injection molded from a suitable plastic such as, for example, polypropylene or polyethylene, providing adequate rigidity yet allowing suitable flexual capability for the tab members 24. More preferably, in order to provide good flexual capability for the tab members 24, the sleeve 18 is composed of polypropylene. However, any other suitable material such as a suitable metal may be used, and the material may be fabricated by any other suitable process such as machining in addition to injection molding. It is preferred that the tab members 24 be biased to return the first tab member portions 36 back to their original positions, as shown in FIG. 2, after passage through the throat 12.

The igniter tube 16 is comprised of a generally cylindrical elongated housing 52 which contains a chamber 54 which is filled with a suitable pyrotechnic material 56. Rearwardly of and adjacent the pyrotechnic material 56 is disposed a suitable initiator 58 such as, for example, a Tracor model 105 electrical initiator including electric lead wires 60 leading therefrom through aperture 62 in the igniter tube.

After the sleeve 18 has been inserted into the throat 12 into position as shown in FIG. 2 with the second tab member portions 40 in the throat, the first tab member portions 36 disposed inwardly just beyond the throat, and surfaces 46 and 48 engaging the diverging portion of the nozzle, the igniter tube 16 is then inserted into the sleeve aperture 32 and secured to the sleeve 18 by means of threads illustrated at 64 or other suitable means. Apertures illustrated at 66 and 68 or other suitable means are preferably provided in the axially outer surfaces of the sleeve 18 and igniter tube housing 52 respectively to aid in installing the igniter tube 16 in the sleeve 18 and in removing it therefrom. As shown, the axially outer portion 28 of the body portion 22 of the sleeve 18 is enlarged to have a greater thickness to not only provide secure engagement of the sleeve 18 against the wall of the nozzle 14 as previously discussed but also to provide ample structure for the threads 64 and the apertures 66. An o-ring 70 or other suitable sealing means is preferably provided in the radially outer surface of the igniter tube housing 52 to provide sealing engagement between the igniter tube 16 and the sleeve 18 so that, with the sleeve 18 in sealing engagement with the nozzle 14 as previously discussed, the rocket motor chamber may be environmentally sealed prior to use.

The pyrotechnic charge 56 may be any suitable material such as, for example, a mixture of magnesium and teflon powder in approximately equal proportions. After the chamber 54 has been charged with pyrotechnic material 56, a suitable compressible foam spacer 72 is inserted to fill the remaining volume of the igniter tube chamber 54 in order to keep the charge 56 tight so that the pyrotechnic material doesn't rattle around and in order to insure positive contact of the charge 56 with the initiator 58. A suitable closure plug 74, which may be composed of polyethylene or other suitable material, is then pressed against the spacer 72 to compress it against the pyrotechnic material 56 and is snapped into place in a slot 76 in the forward end of the igniter tube housing 52.

When burning of the pyrotechnic material 56 is initiated by the initiator 58 upon a signal transmitted through lead wires 60, pressures which are built up in the chamber 54 cause the plug 74 to be blown out and expel the burning mixture over the length of the solid propellant cavity to ignite the solid propellant in the rocket motor.

After ignition has begun, it is desirable to maintain the igniter 10 in position to act as a nozzle closure until a predetermined pressure level is attained in the rocket motor chamber in order to improve the ignition performance. After this predetermined pressure level is attained, it is then desirable that the igniter 10 be expelled from the motor. Typically, for a rocket motor which operates within a range of 1500 psi (pounds per square inch), it is considered desirable that the igniter be expelled at a predetermined pressure which is in the range of about 200 to 300 psi. In order to achieve this objective in accordance with the present invention, the second tab member portions 40 are sized, in accordance with principals commonly known to those of ordinary skill in the art to which this invention pertains, to fail in tension at the predetermined pressure. For example, the second tab member portions 40 may have a thickness, illustrated at 78, of perhaps 0.1 inch and be composed of polypropylene material. When the motor chamber predetermined pressure causes the frangible tab member portions 40 to break, the igniter 10 is as a result no longer locked in place by the first tab member portions 36, and the igniter may thus be freely expelled from the nozzle 14.

In order to effect positive return of the first tab member portions 36 to the position shown in FIG. 2 such that the igniter 10 may be locked in place in the nozzle throat 12 by insertion of the igniter tube 16 but can be readily and easily removed by removing the igniter tube 16 and flexing the tab members 24 to effect movement of the tab member portions 36 radially inwardly and then pulling the sleeve 18 out, in accordance with a preferred embodiment of the present invention the thickness of each of the second tab member portions 40 is such that the inner diameter defined by the plurality of second tab member portions 40 in combination is substantially equal to the diameter 42 of the body portion aperture 32, and the outer diameter defined by the plurality of second tab member portions 40 in combination is substantially equal to the throat diameter 20. In addition, the inner diameter defined by the plurality of first tab member portions 36 in combination is preferably substantially equal to the diameter 42 of the body portion aperture 32. More preferably, in order to insure satisfactory locking of the sleeve 18 by insertion of the igniter tube 16, the difference between the inner diameter defined by the plurality of first tab member portions 36 in combination and the outer diameter, illustrated at 80, of the igniter tube thereat is no more than 0.010 inch, more preferably less than 0.005 inch.

The thickness of the igniter tube housing 52, illustrated at 82, should be sufficient to prevent failure prematurely, and may be determined using principles commonly known to those of ordinary skill in the art to which this invention pertains. For example, this thickness 82 may be in the range of 0.15 to 0.50 inch at the thinnest point.

The leading edges 84 of the first tab member portions 36 are preferably tapered, such as shown in FIG. 2, in order to more easily effect radially inwardly movement thereof to clear the nozzle throat 12.

In order to provide safety during shipment and handling and maintenance, the igniter tube 16 may be easily removed as previously discussed and replaced with a similarly shaped desicated shipping closure which may also provide environmental sealing of the rocket motor. Alternatively, the igniter tube 16 may be replaced with a pressurization adapter.

The present invention is meant to include an embodiment wherein, in their unflexed positions the tab members are oriented such that the first tab member portions are insertable through the nozzle throat and must be flexed to the position shown in FIG. 2 by insertion of the igniter tube.

It is to be understood that the invention is by no means limited to the specific embodiments which have been illustrated and described herein, and that various modifications thereof may indeed be made which come within the scope of the present invention as defined by the appended claims.

We claim:

1. An igniter removably insertable in a rocket motor nozzle throat, the igniter comprises a sleeve having an axis and a generally cylindrical aperture means extending axially therethrough for insertion of an igniter tube therein, said sleeve comprises a body portion and a plurality of tab members extending axially from one end of said body portion and spaced apart circumferentially thereof, a first portion on each said tab member which extends radially outwardly such that a diameter defined by the plurality of said first tab member portions in combination is greater than a diameter of the nozzle throat, said tab members being composed of a material which allows said tab members to flex whereby said first tab member portions are movable radially inwardly so that said plurality of said first tab member portions may be inserted through the nozzle throat, said body portion having a diameter greater than a diameter of the nozzle throat, and the igniter further comprises an igniter tube containing ignition material which igniter tube is removably insertable in said sleeve aperture means and removably attachable to said sleeve, means for igniting said ignition material, and frangible means for effecting separation of said plurality of first tab member portions from said sleeve at a predetermined pressure in the rocket motor.

2. An igniter according to claim 1 wherein said frangible means comprises thin second portions of said tab members connected between said first tab member portions respectively and said body portion and each of which has a thickness which is selected to effect said separation of said plurality of said first tab member portions at said predetermined pressure.

3. An igniter according to claim 2 wherein said sleeve is composed of a single piece of material selected from the group consisting of polypropylene material and polyethylene material.

4. An igniter according to claim 3 wherein each of said tab members further includes a second portion connected between said respective first tab member portion and said sleeve body portion, and said plurality of said second tab member portions are, when said igniter tube is inserted in said sleeve aperture means to extend beyond said plurality of tab members, sized to define in combination an outer diameter which is equal substantially to the nozzle throat diameter whereby said second tab member portions are insertable in the nozzle throat when the first tab member portions are positioned to define in combination a diameter greater than the nozzle throat diameter.

5. An igniter according to claim 1 wherein the inner diameter defined by the plurality of said first tab member portions in combination is substantially equal to the outer diameter of said igniter tube.

6. An igniter according to claim 5 wherein the difference between said first tab member portions inner diameter and said igniter tube outer diameter is less than about 0.010 inch.

7. An igniter according to claim 5 wherein each of said tab members further includes a second portion connected between said respective first portion and said sleeve body portion, and the plurality of said second tab member portions are sized to define in combination an outer diameter which is equal substantially to the nozzle throat diameter whereby said second tab member portions are insertable in the nozzle throat and said first tab member portions may be insurably urged to their unflexed positions after insertion through and beyond the nozzle throat by insertion of said igniter tube and thereby the igniter may be removably locked in position in the nozzle throat.

8. An igniter according to claim 1 wherein said sleeve is composed of a single piece of injection molded plastic material.

9. An igniter according to claim 1 wherein said tab member flexing means comprises a second portion on each said tab member integrally connected between said respective first portion and said body portion and composed of polypropylene material.

10. An igniter removably insertable in a rocket motor nozzle throat, the igniter comprises a sleeve having an axis and a generally cylindrical aperture means extending axially therethrough for insertion of an igniter tube therein, said sleeve comprises a body portion and a plurality of tab members extending axially from one end of said body portion and spaced apart circumferentially thereof, a first portion on each said tab member which extends radially outwardly such that a diameter defined by the plurality of said first tab member portions in combination is greater than a diameter of the nozzle throat, said tab members being composed of a material which allows said tab members to flex whereby said first tab member portions are movable radially inwardly so that said plurality of said first tab member portions may be inserted through the nozzle throat, said body portion having a diameter greater than a diameter of the nozzle throat, and the igniter further comprises an igniter tube containing ignition material which igniter tube is removably insertable in said sleeve aperture means and removably attachable to said sleeve, means for igniting said ignition material, and frangible means for effecting separation of said plurality of first tab member portions from said sleeve at a predetermined pressure in the rocket motor, and said sleeve is composed of a single piece of material selected from the group consisting of polypropylene material and polyethylene material.

11. An igniter removably insertable in a rocket motor nozzle throat, the igniter comprises a sleeve having an axis and a generally cylindrical aperture means extending axially therethrough for insertion of an igniter tube therein, said sleeve comprises a body portion and a plurality of tab members extending axially from one end of said body portion and spaced apart circumferentially thereof, a first portion on each said tab member, said tab members being composed of a material which allows said tab members to flex between a position wherein a diameter defined by said plurality of first tab member portions in combination is greater than a diameter of the nozzle throat and a position wherein said plurality of first tab member portions is insertable through the nozzle throat, said body portion having a diameter greater than a diameter of the nozzle throat, and the igniter further comprises an igniter tube containing ignition material which igniter tube is removably insertable in said sleeve aperture means and removably attachable to said sleeve, means for igniting said ignition material, and frangible means for effecting separation of said plurality of first tab member portions from said sleeve at a predetermined pressure in the rocket motor.

12. An igniter according to claim 11 wherein said sleeve is composed of a single piece of polypropylene material.

13. An igniter according to claim 11 further comprises means for sealing the igniter in the nozzle.

14. An igniter according to claim 11 wherein said frangible means comprises thin second portions of said tab members connected between said first tab member portions respectively and said body portions and each of which has a thickness which is selected to effect said separation of said plurality of said first tab member portions at said predetermined pressure.

15. An igniter according to claim 14 wherein said sleeve is composed of a single piece of material selected from the group consisting of polypropylene material and polyethylene material.

16. An igniter according to claim 15 wherein said igniter tube has an outer diameter, said first member portions are sized such that, when the igniter is installed in the nozzle, said first tab member portions engage the nozzle and an inner diameter defined by said plurality of first tab member portions in combination is substantially equal to said outer diameter of said igniter tube whereby the sleeve is locked in position in the nozzle when the igniter tube is inserted in the sleeve aperture means.

17. An igniter according to claim 11 wherein said igniter tube has an outer diameter, said first tab member portions are sized such that, when the igniter is installed in the nozzle, said first tab member portions engage the nozzle and an inner diameter defined by said plurality of first tab member portions in combination is substantially equal to said outer diameter of said igniter tube whereby the sleeve is locked in position in the nozzle when the igniter tube is inserted in the sleeve aperture means.

* * * * *